Feb. 9, 1971

E. C. BRYANT 3,562,062

TIRE BUILDING DRUM HAVING A RADIALLY MOVABLE
INTERMEDIATE ASSEMBLY

Filed June 3, 1969

Inventor:-
Emerson C. Bryant,
By Brown, Jackson, Boettcher & Dienner
Attys.

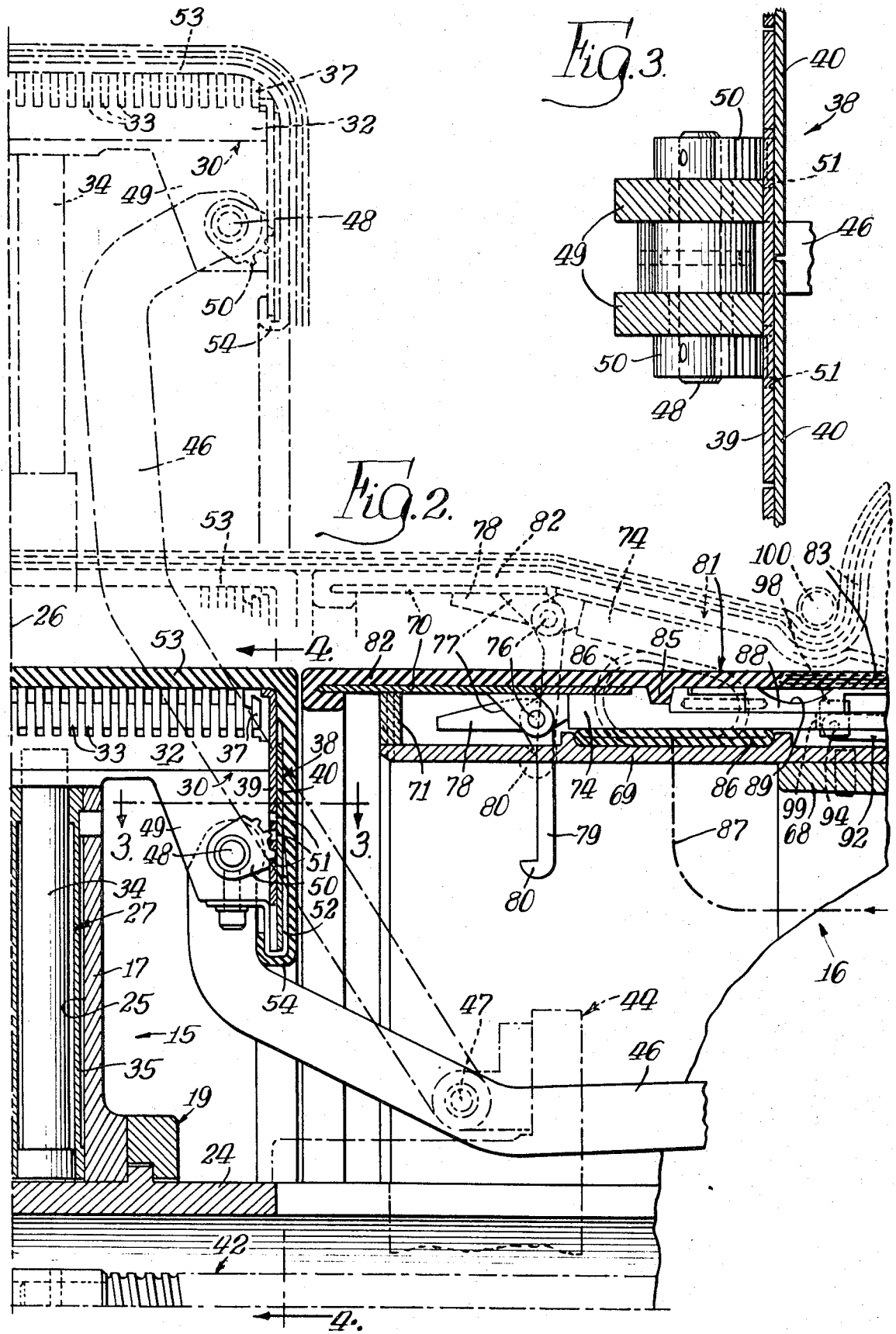

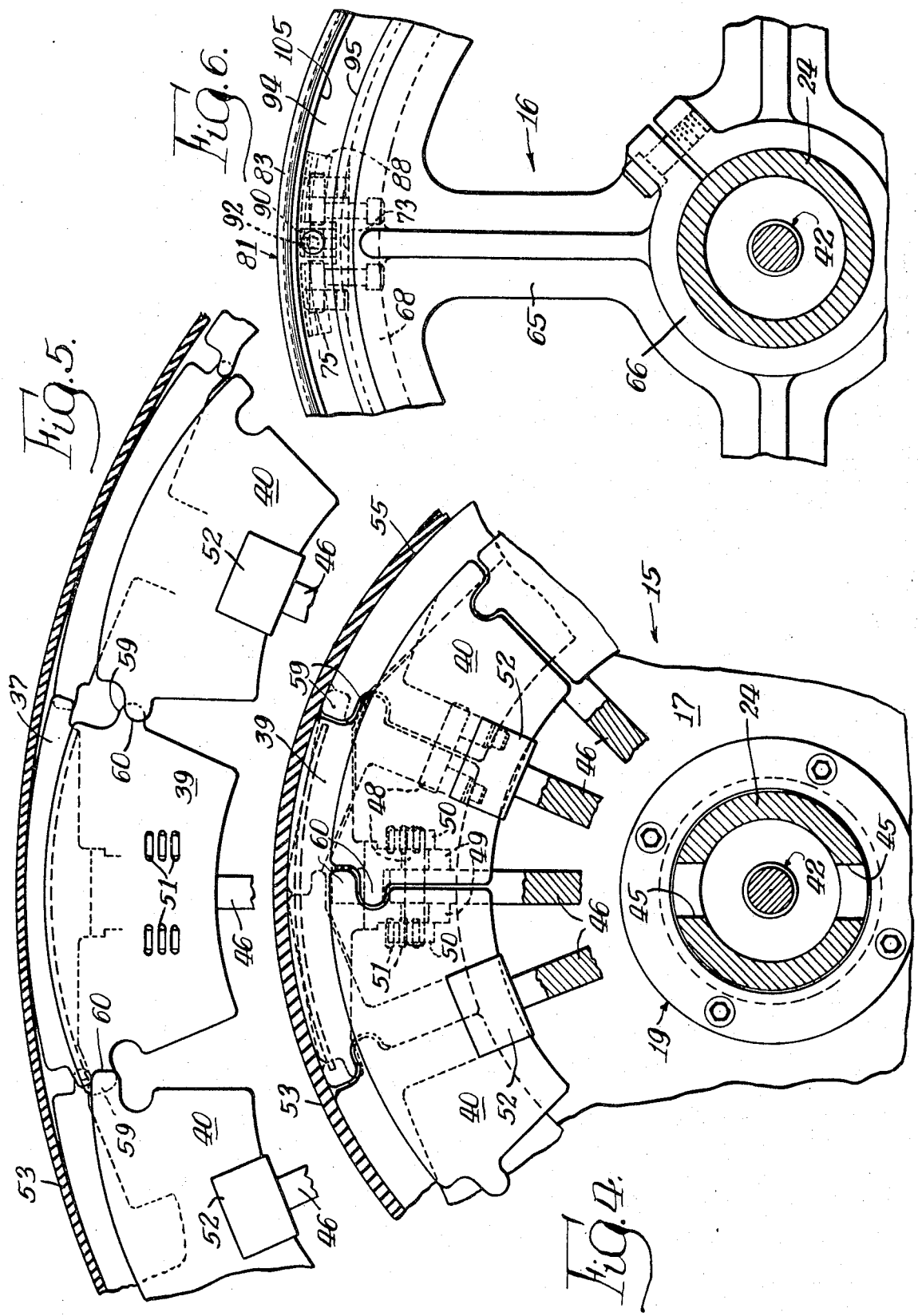

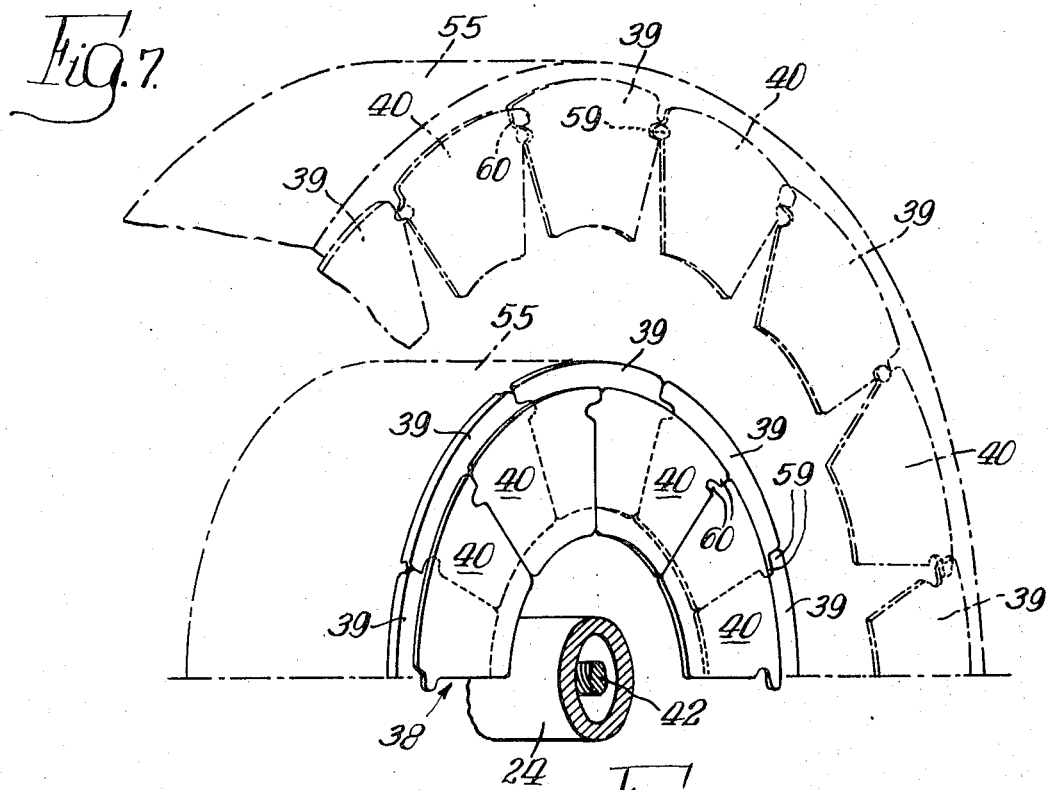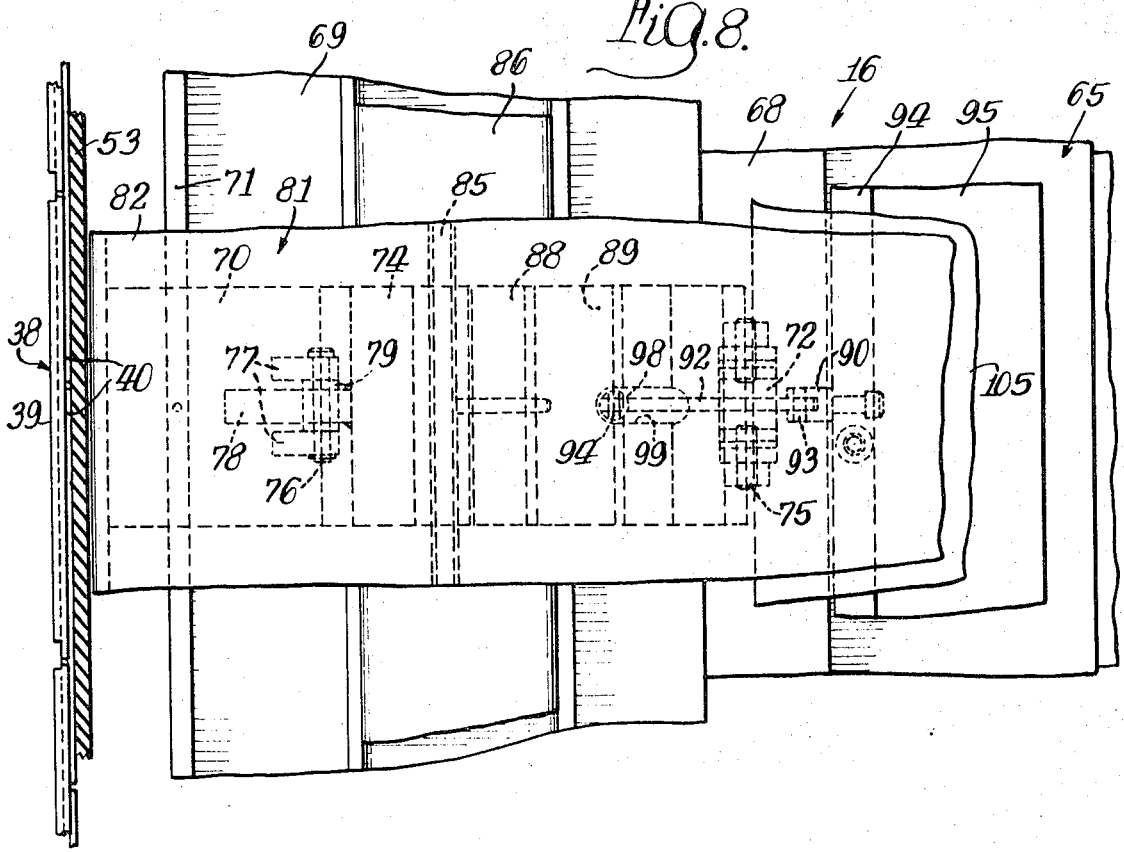

United States Patent Office 3,562,062
Patented Feb. 9, 1971

3,562,062
TIRE BUILDING DRUM HAVING A RADIALLY MOVABLE INTERMEDIATE ASSEMBLY
Emerson C. Bryant, South Bend, Ind., assignor to National-Standard Company, Niles, Mich., a corporation of Delaware
Filed June 3, 1969, Ser. No. 829,915
Int. Cl. B29h 17/26
U.S. Cl. 156—401                                    10 Claims

ABSTRACT OF THE DISCLOSURE

A tire building machine having an annular intermediate assembly defined by a plurality of circumferentially arranged intermediate sections each having a plurality of interleaved first supporting members movable radially and circumferentially relative to each other to form substantially cylindrical supporting surfaces of different predetermined radii, and a plurality of second supporting members adjacent the axially outermost of the first supporting members having outer curved edges, and blade means adjacent the second supporting members to provide end supporting cylinderical surface portions of radii substantially the same as the radius of a first predetermined cylindrical surface of the first supporting members, and which blade means together with the outer curved edges of the second supporting members define curved shoulders extending radially inwardly from the outer edges of a second predetermined cylindrical surface of the first supporting members.

Method of building pneumatic tires in which tire carcass material is supported in the form of a tubular cylinder, disposing tire beads inwardly of the ends of the tubular cylinder for encasement by displacing the outer end portions of the tubular cylinder axially inwardly around the tire beads, and radially displacing the intermediate portion of the tubular cylinder while moving the encased tire beads axially toward each other to form the tire carcass material into torus configuration having a substantially cylindrical crown portion and radially inwardly extending sidewall portions, and in which rounded end shoulder portions connect the crown portion with the side wall portions.

CROSS REFERENCES TO RELATED APPLICATIONS

Larry C. Frazier, application Ser. No. 663,931 filed Aug. 24, 1967, now Patent No. 3,485,692.

Edwin E. Mallory and Larry C. Frazier, application Ser. No. 567,275, filed July 22, 1966, now Patent No. 3,490,980.

Larry C. Frazier and Edwin E. Mallory, application Ser. No. 647,732, filed June 21, 1967.

Larry C. Frazier, application Ser. No. 736,363 filed June 12, 1968; and

Larry C. Frazier, application Ser. No. 780,435, filed Dec. 2, 1968.

BRIEF SUMMARY OF THE INVENTION

The present invention relates to the pneumatic tire building art and is concerned with the building of tires starting with tire carcass material of tubular cylindrical configuration. The apparatus and method lend themselves for building both bias angle tires and radial tires.

The invention embodies a tire building drum having an intermediate assembly characterized by a plurality of circumferentially arranged intermediate sections each comprising a plurality of interleaved intermediate first and second supporting members movable radially inwardly and outwardly, and circumferentially relative to each other, blade means at the ends of each of the intermediate sections, and end assemblies, one each end of the intermediate assembly, which together in the radial inward positions of the intermediate sections the first supporting members together with the blade means define a cylindrical supporting surface for applying tire carcass material in the form of a tubular cylinder. In the radial outward positions of the intermediate sections of the intermediate assembly the tire carcass material is formed into substantially torous configuration having a crown portion and radially inwardly extending sidewall portions with the first supporting members defining a substantially cylindrical surface at the crown of the tire carcass, and in which the outer edges of second supporting members and the blade means form curved end shoulders between the crown and sidewall portions of the tire carcass material.

The aforementioned end assemblies each comprise an end frame providing for the support of tire bead shoulder forming means for radially displacing the tire carcass material into engagement with tire beads disposed inwardly of the ends of the cylinder of tubular material. The apparatus of the invention further embodies an elastomeric sleeve encasing the intermediate assembly, and second elastomeric sleeves encasing each of the end assemblies, and with the latter sleeves having inflatable bag portions at the outer ends thereof.

Rack means are associated with the blade means disposing blade components of the latter in the inward radial positions of the intermediate sections to lie with the outer edges of such blade components lying at a radius substantially equal to the radius of the first supporting members of the intermediate section, and in the radial outer positions of the intermediate sections to be disposed radially inwardly of the second supporting members and together with the latter provide rounded end shoulders extending from the outer cylindrical surface of the first supporting members of the expanded intermediate assembly radially inwardly at the opposite ends thereof.

BRIEF DESCRIPTION OF THE DRAWINGS

FIG. 2 is an enlarged view of a portion of the center section assembly and end assembly shown in FIG. 1a and illustrating in dotted lines the position of the parts at which tire beads are incorporated with the carcass, and in dot-dash lines the positions of the parts of the intermediate assembly at which the tire carcass material is formed into torous configuration approximating that of a completed tire;

FIG. 3 is a detail horizontal sectional view taken along the line 3—3 on FIG. 2 looking in the direction indicated by the arrows;

FIG. 4 is a vertical sectional view taken along the line 4—4 on FIG. 2 looking in the direction indicated by the arrows showing the components of the intermediate assembly at their inner radial positions;

FIG. 5 is a view showing certain of the components of the intermediate assembly of FIG. 4 at their outer radial positions;

FIG. 6 is an end view of the end assembly of FIG. 1a;

FIG. 7 is a diagrammatic perspective view showing in full lines the positions of the blade means at the outer ends of the intermediate assembly in their radial inner positions, and in dotted lines in their outer radial positions; and FIG. 8 is a plan view of one of the end assemblies of the tire building drum of the invention taken along the line 8—8 on FIG. 1a and looking in the direction indicated by the arrows.

DETAILED DESCRIPTION

Figure 1A:
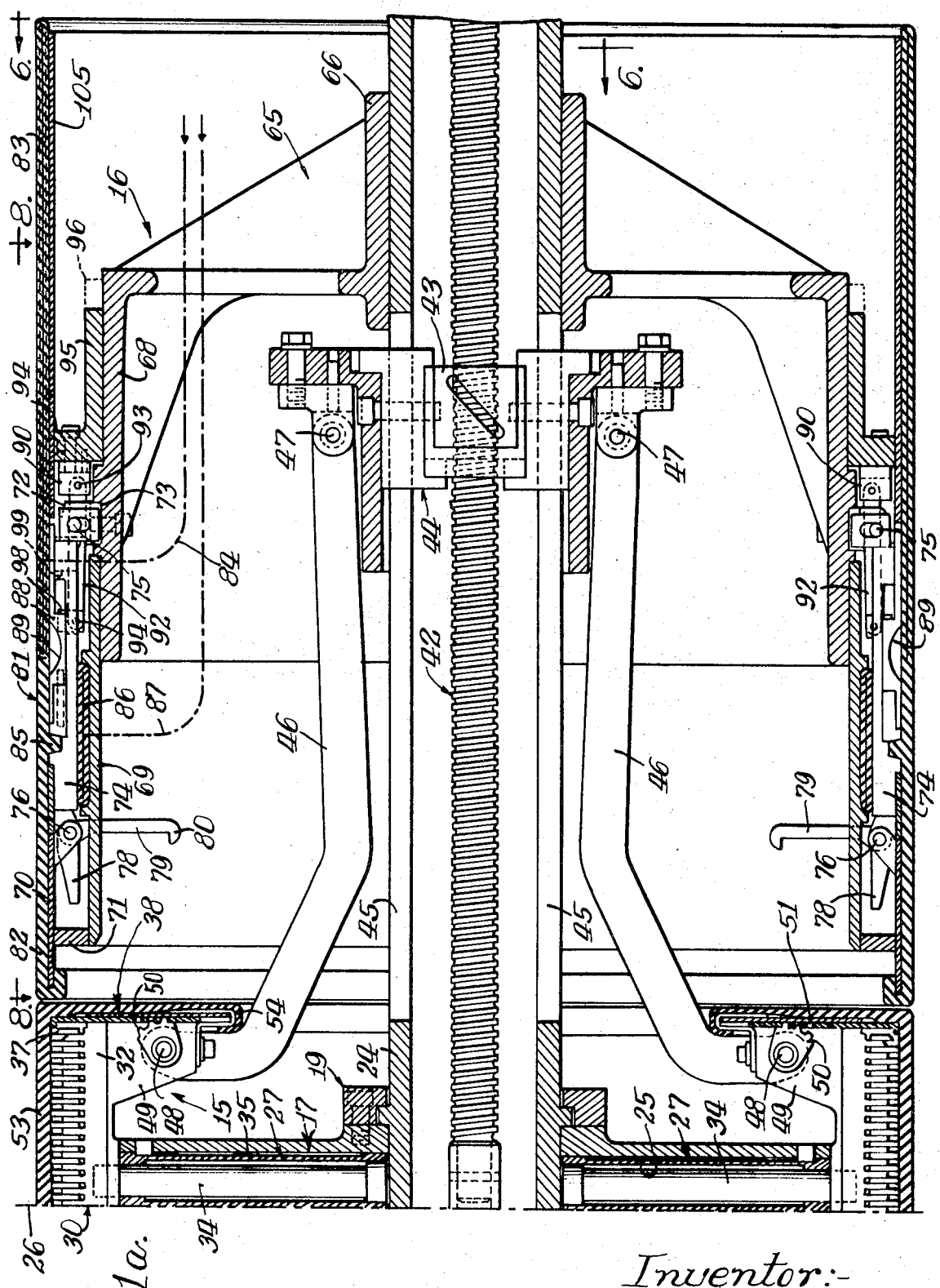
FIGS 1a and 1b show longitudinal vertical sections of the right and left-hand portions, respectively of a pneumatic tire building apparatus of the invention, and which figures joined on the vertical dot-dash center lines illustrate a full sectional view, certain parts in the two views being shown in elevation, and in which an intermediate assembly and end assemblies of the apparatus are in positions defining a cylindrical surface for supporting tire carcass material in the form of a tubular cylinder therearound.
Figure 1B:
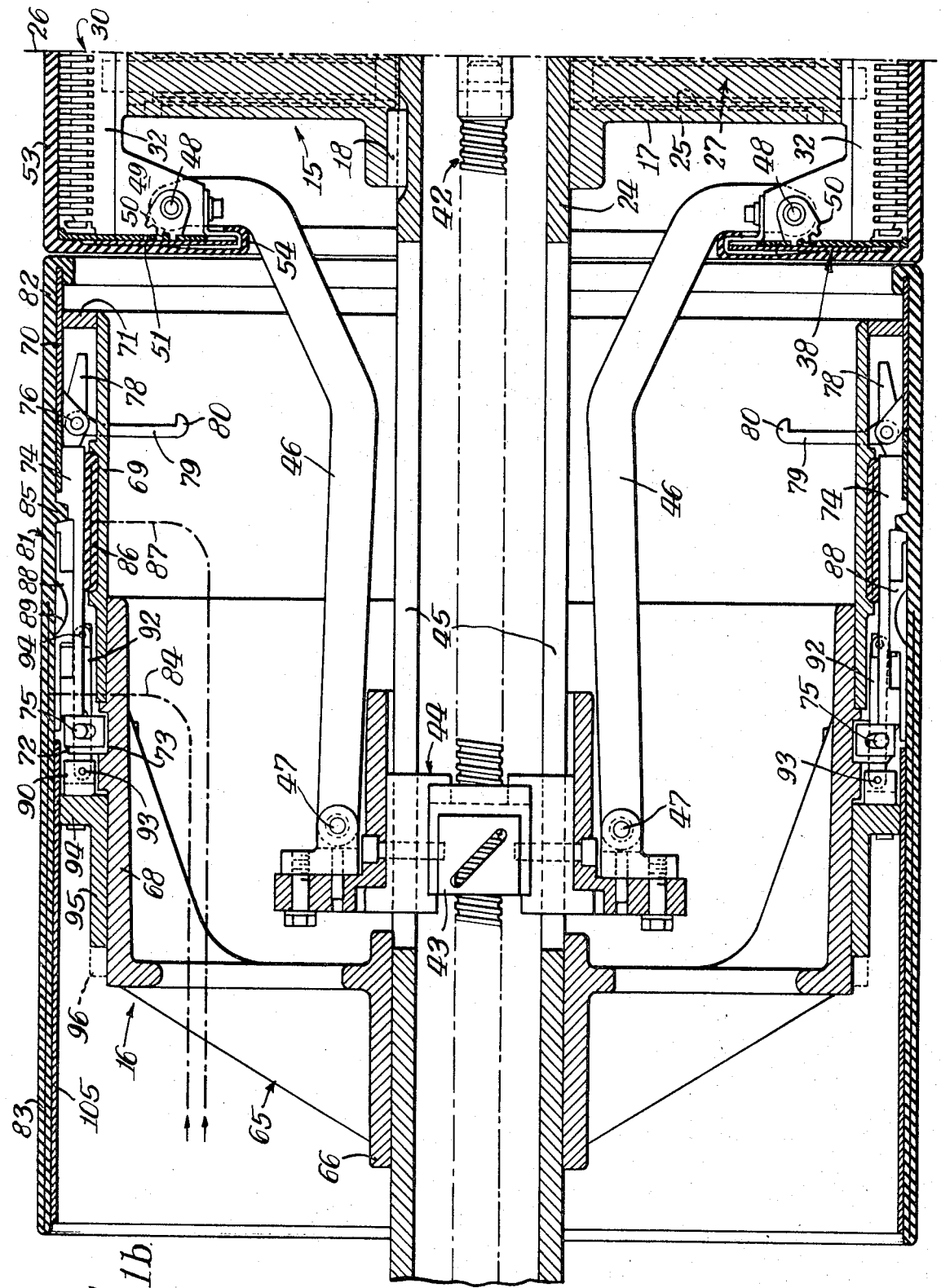

Referring now to FIGS. 1a and 1b of the drawings the tire building apparatus of the invention there shown comprises an intermediate assembly, indicated generally at 15, and left and right hand end assemblies 16, one at each end of the intermediate assembly 15.

The intermediate assembly 15 comprises a hub member 17 splined as at 18 intermediate and between the ends of a hollow shaft 24 and retained against axial movement with respect to the shaft as at 19. The hub member is formed with a plurality of radially extending bores 25 which lie alternately at opposite sides of the radial center line 26 of the hub. The several bores 25 each receive telescopic assemblies 27, one for each of a plurality of circumferentially arranged intermediate sections 30 of the intermediate assembly 15. As best seen in FIGS. 1a, 1b and 2, each intermediate section comprises a body portion 32 having a plurality of axially spaced apart intermediate first supporting members or blades 33, and in which the intermediate first supporting members 33 of circumferentially adjacent intermediate sections are interleaved, with the ends of the intermediate first supporting members 33 of one intermediate section fitting into the spaces between adjacent first supporting members of circumferentially adjacent intermediate sections. Each of the several intermediate sections 30 are mounted at the outer ends of an inner telescopic member 34 mounted in an outer telescopic member 35 of a telescopic assembly 27. The inner telescopic members 34 are thus arranged within the outer telescopic members 35 for movement radially inwardly and outwardly in the manner to be described, and upon such radial inward and outwar movement the intermeiate first supporting members 33 also move circumferentially relative with respect to each other so that the outer surface of the intermediate assembly, dependent upon the radial inward and outward positions of the several intermediate sections, define rigid supporting surfaces at different diameters. The outer circumferential surfaces of the intermediate first supporting members 33 are of convex configuration peripherally to provide substantially cylindrical supporting surfaces in the radial inward and outward positions of the several intermediate sections 30.

The intermediate sections each further comprise second supporting members 37 of blade like configuration disposed at the outer ends of the first supporting members with the several outer edges of such second supporting members being curved transversely to form rounded shoulders at the outer ends of the intermediate assembly as best seen in the expanded position of the intermediate assembly in FIG. 2 in the radial outward positions of the several intermediate sections.

As best seen in FIG. 2, blade means, indicated at 38, comprising a plurality of first and second blade like components 39 and 40 are disposed adjacent the axially outermost second supporting members 37. The several blade components 39 in the radial inward positions of the intermediate section have their outer peripheries lying at a radius substantially equal to the radius of the first supporting members 33 in the radial inward positions of the several intermediate sections to provide in the position of the parts as shown in FIGS. 1a and 1b a first predetermined supporting surface of substantially uniform diameter. In the radial inward positions of the several intermediate sections it will be observed that the transversely curved outer edges of the second supporting members 37 lie within the aforementioned cylindrical surface as defined by the outer peripheries of the first supporting members and the several blade components 39.

The hollow shaft 24 may be mounted for rotation at its opposite ends in any suitable manner. Drive shaft means 42 is supported for rotation in suitable bearings (not shown) to extend axially within the hollow shaft or sleeve 24. Drive shaft means 42 is driven from any suitable power source (not shown). The opposite end portions of the drive shaft means 42 are oppositely threaded for receiving end head components 43 which are reciprocated axially toward and away from each other upon rotation of drive shaft means 42. The end head components 43 may be of conventional ball nut construction upon which a guide block assembly 44 is mounted, with the guide block assemblies having guide elements disposed in axially extending guide slots 45 in the hollow shaft 24 so that upon rotation of drive shaft means 42 the guide block assemblies 44 may be moved axially toward and away from each other in the guide slots 45 of the hollow shaft 24. A plurality of links, such as shown at 46, are pivotally mounted at one end as at 47 in the guide block assemblies 44. Each of the links 46 at its opposite or inner end is fixed to a pin 48 journalled in radially inwardly extending flange portions 49 of each of the intermediate sections 30. A link 46 extends from each of the guide block assemblies 44 to each of the intermediate sections with the several links being arranged in circumferential array about hollow shaft 24, and extending as noted from the guide block assemblies 44 to each of the intermediate sections 30. A gear segment 50 is made fast to each end of each of the pins 48 mounted in links 46. Spaced apart brackets 49 extend radially inwardly from body members 32 and lie between the links 46 and the end gear segments 50, and the gear teeth of the gear segments 50 are adapted to engage in laterally spaced apart rows of slots 51 formed in each of the blade-like components 39 of the blade means 38. The second blade-like components or segments 40 of the blade means 38 lie outwardly of the blade-like components 39, and each is formed with a flange portion 52 which is secured to an inner portion of brackets 49 of each of the intermediate sections 30. An annular elastomeric sleeve 53 circumferentially encases the several intermediate sections 30 and the blade means 38. The elastomeric sleeve 53 is provided with an annular radially inner portion of channel like cross section, as shown at 54, for encasing the lower end of the blade-like components or segments 40, and serving to anchor the sleeve in position circumferentially around the intermediate assembly.

In the components of the apparatus thus far described, it will be observed that upon the axial inward movement of the guide block assemblies 44 toward each other, the intermediate sections 30 through the several links 46 effect radial outward movement of the intermediate sections 30 as, for example, from the full line position shown in FIG. 2 at which there is defined a cylindrical surface of first predetermined minimum diameter successively to the positions shown in dotted lines and in dot-dash lines. The telescopic assemblies 27 serve to guide the intermediate sections 30 radially inwardly and outwardly upon movement of the guide block assemblies 47 axially toward and away from each other.

In the diagrammatic perspective view of the blade means 38 as shown in FIG. 7 of the drawings, it will be observed that in the radial inward positions of the intermediate sections 30 that the blade-like components 39 and 40 lie side by side and in overlapping relation in the full line position of the parts shown in this figure. In this last noted position of the blade means 38, the outer edges of the blade-like components 39 lie in the cylindrical surface 55 defined by the supporting members 33 of the intermediate sections 30. In the radial outer positions of the intermediate sections 30 as effected by the axial inward movement of the guide block assemblies 44 toward each other the several blade-like components 39, as shown in the dot-dash line positions of FIGS. 2 and 7 have peripheral edges thereof disposed radially inwardly of the curved outer edges of the second supporting members 37 with the latter and the several blade components defining a curved shoulder extending radially inwardly from the cylindrical surface defined by the first supporting members 33 to provide a radius between the crown portion of displaced carcass material and the side wall portions of the latter. The blade-like components 39 and 40 are preferably provided with side projections 59 and 60 to overlap adjacent surface portions of the respective blades to maintain the blade members in proper position upon the radial inward and outward movement of the several intermediate sections 30.

It will be noted in the aforedescribed construction that in the radial inward positions of the several intermediate sections 30, that a substantially cylindrical surface of a predetermined minimum diameter is defined by the first supporting members 33, and the outer edges of the blade members 39, and in the radial outer positions of the intermediate sections 30 the second supporting members 37 and the inner blade members 39 define a curved supporting surface between the crown portion of tire carcass material and a side wall portion of such carcass material. The several gear segments 50 engaging in slots 51 of the blade-like components 39 assures the appropriate radial inward and outward movement of the latter upon the axial inward and outward movement of the guide block assemblies 44 with respect to each other. Also the blade-like components 40 serve as gap shields for the blade-like components 39 in the radial outer positions thereof.

Upon reference now to FIGS. 1a, 2, 6 and 8, it will be seen that each end assembly 16 comprises a ribbed annular casting 65 having a hub portion 66 for mounting the casting about the outer end portions of the shaft 24.

The casting 65 is provided with a first annular outer portion 68 extending axially inwardly toward the intermediate assembly, and which at its inner end provides for the support of an inner annular sleeve member 69. A bag anchoring sleeve 70 is disposed radially outwardly of and overlies a portion of sleeve 69 and which together with a transversely extending ring member 71 closes a chamber formed at the inner ends of the sleeves 69 and 70. A plurality of yoke blocks 72 are mounted on flats 73 formed on the periphery of the annular portion 68 of casting 65. A plurality of circumferentially arranged segment members 74 are pivoted at 75 in slots in each of the yoke blocks 72 and at their inner ends are provided with a pivot pin 76 supported in bifurcated brackets 77 mounted on bag anchoring sleeve 70. A stop member 78 is carried at the inner end of the segment members 74. A hook 79 is hinged at its inner end on the pivot pin 76 and at its radial inwardly extending end includes a hook portion 80. The several aforedescribed parts are held in a collapsed position by an elastomeric turn-up bag means 81 anchored at its inner end on the bag anchoring sleeve 70.

The elastomeric bag turnup means 81 at its axial inner portion 82 is of solid construction, and the axial outer portion is split into inner and outer components sealed at their inner and outer ends so as to form a bag 83 which is inflatable upon admission of air under pressure between the inner and outer portions thereof through conduit 84. The elastomeric bag turnup means 81 at the axial inner portion 82 thereof is formed with an internal annular V-shaped-like flange 85 fitting into a conformed V-like groove in the several segment members 74 to secure the bag turnup means 81 in position on the end assemblies.

An annular segment moving bag means 86 is supported on sleeve 69 adjacent the axial inner ends of segment members 74 and upon admission of fluid under pressure thereto, such as air under pressure through conduit 87 effects outward movement of the segment members about their pivots 75 to the position shown in dotted lines in FIG. 2 to incorporate tire beads inwardly of the outer end portions of tire carcass material supported in tubular form initially on the intermediate and end assemblies. A plurality of bead setting blocks 88 having bead defining recesses 89 are each pivotally attached to a yoke 90 by a link 92 pivoted as at 93 to the yoke 90 and as at 94 to each bead set block. The yoke 90 is secured to the radial outer flange 94 of a ring member 95 mounted for axial sliding movement on the outer annular sleeve 68 of the end assemblies 16. Upon movement of ring 95 to the position indicated in dotted lines at 96, all of the bead set blocks 88 will move outwardly to the position shown in dotted lines in FIG. 2 forming an annular groove around the drum at an increased bead set dimension. The bead set blocks 88 are guided in any position of adjustment by pins 98 having sliding engagement in slots 99. The several links 92 allow each head set block 88 to expand or move with the segment members 74. The elongated slot in the block 72 allows the outward end of the segments 74 to move outwardly until restrained by beads such as shown at 100 in FIG. 2 thus assuring a tight stitch of the tire carcass material at the beads. It will be understood that suitable bead setting means not shown are provided for positioning the beads over the opposite ends of the tire carcass material on the end assemblies while the carcass tire material is in its initial tubular form around the intermediate and end head assemblies, and upon movement of the bead set blocks as above described stitching of the tire carcass material around the tire beads is effected. An outer annular metal sleeve 105 is suitably supported on the member 95 to provide for the support of the turnup inflatable bag means 80.

OPERATION OF THE APPARATUS AND METHOD

As has already been noted in building a tire on the apparatus and according to the method of the present invention, the intermediate assembly 15 and end assemblies 16 are disposed to their full inner radial positions shown in FIGS. 1a and 1b, and in this position of the parts tire carcass material is supported in the form of a tubular cylinder around the drum. Thereafter, the intermediate assembly and the end assemblies are disposed to their positions shown in dotted lines at FIG. 2 at which time tire beads previously have been placed over and inwardly of the outer ends of tire carcass material are stitched to the tire carcass material. It will be noted that the end assemblies in the dotted line position of FIG. 2 define frusto conical supporting surfaces the small diameter ends thereof lying outwardly away from the intermediate assembly. Thereafter the inflatable bag turnup means 81 are inflated and known pusher means, not shown, are advanced axially toward each other to engage the bag means 83 and the ply material thereon to lay the end portions of the ply material of the tubular cylinder over the beads 100.

It will be noted that in the initial position of the intermediate and end assemblies that tire carcass material is supported in the form of a tubular cylinder, and that the second supporting members 37 of the several intermediate sections 30 all lie radially within the outer peripheries of the several supporting members 33 and the periphery of the blade-like components 39.

Continuing then, after incorporation of the tire beads with the tire carcass material, the elastomeric bag turn-up means is defined and releasing the tire beads for axial movement toward each other, the end block assemblies 44 are moved axially toward each other, and which through the several links 46 position the intermediate assemblies 33 to the dot-dash line positions of FIG. 2. As previously noted, the second supporting members 37 and the blade-like components 39 now form curved radius or supporting surfaces extending radially inwardly from the crown portion of the tire carcass material to the side wall portions thereof. With the components in the position last noted an inextensible tread component or breaker and tread may be applied to the crown portion of the carcass material. Other components such as sidewall components may also be incorporated with the tire carcass material in the position last noted or in the position at which the tire beads are encased with the end portions of the tubular cylinder of tire carcass material.

The invention claimed is:

1. In a tire building machine an annular assembly comprising an intermediate assembly comprising a plurality of first and second circumferentially arranged intermediate sections each comprising a plurality of first supporting members disposed in spaced apart side-by-side relation with the first supporting members of the first of said sections being disposed between the first supporting members of said second section for movement radially and circumferentially relative to each other to provide substantially cylindrical supporting surfaces of different predetermined radii, a plurality of second supporting members adjacent the axially outermost of said first supporting members disposed in spaced apart side-by-side relation with said second supporting members of the first of said sections being disposed between said second supporting members of said second sections for movement radially and circumferentially relative to each other, and said second supporting members having outer edges of configurations to define curved end surfaces extending radially inwardly of a first predetermined substantially cylindrical supporting surface of said first supporting members.

2. The tire building machine of claim 1 characterized by the provision of blade means adjacent said second supporting members to provide end supporting cylindrical surface portions of radii substantially the same as the radius of a second predetermined cylindrical surface of said first supporting members.

3. The tire building machine of claim 1 characterized by the provision of elastomeric sleeve means encasing said intermediate assembly.

4. The tire building machine of claim 1 characterized by the provision of end head components movable axially toward and away from each other, force transmitting means connecting said end head components with said first and second intermediate sections adapted upon movement of said end head components to effect radial and circumferential movement of said first supporting members and said second supporting members with respect to each other.

5. The tire building machine of claim 2 characterized by the provision of end head components movable axially toward and away from each other, force transmitting means connecting said end head components with said first and second intermediate sections adapted upon movement of said end head components to effect radial and circumferential movement of said first supporting members and said second supporting members with respect to each other, gear segment means associated with said first and second sections and having connection with said force transmitting means, and said blade means having first blade components with slots for engagement with said gear segment means providing for radial inward and outward movement of said first blade components blade means upon movement of said end head components toward and away from each other.

6. The tire building machine of claim 1 characterized by the provision of end assemblies at the opposite ends of said annular assembly, a plurality of circumferentially arranged segment members pivotally mounted at their outer ends on said end assemblies adapted in one position thereof to define end extension cylindrical surfaces of radii substantially the same as the radius of a predetermined cylindrical surface of said first supporting members.

7. The tire building machine of claim 6 characterized by the provision of second elastomeric sleeve means encasing said segment members.

8. The tire building machine of claim 7 characterized by said second elastomeric sleeve means having inflatable bag portions at the outer ends thereof.

9. The tire building machine of claim 6 characterized by the provision of inflatable segment bag means adapted upon inflation thereof to effect pivotal movement of said segment members to form an outer surface of substantially frusto-conical configuration extending axially away from a cylindrical supporting surface of predetermined radius of said annular assembly.

10. The tire building machine of claim 9 characterized by the provision of bead setting block means for said segment members defining an annular bead setting recess inwardly of the outer ends of said segment members.

References Cited

UNITED STATES PATENTS

| 2,325,001 | 7/1943 | McLaughlin | 156—415 |
| 3,414,446 | 12/1968 | Pearce et al. | 156—133X |

BENJAMIN A. BORCHELT, Primary Examiner

S. C. BENTLEY, Assistant Examiner

U.S. Cl. X.R.

156—417